United States Patent [19]

Garlick et al.

[11] Patent Number: 4,475,684

[45] Date of Patent: Oct. 9, 1984

[54] MIXING VALVE

[75] Inventors: Ronald G. Garlick, Seven Hills North; Roman Golman, Killarney Heights, both of Australia

[73] Assignee: Robertshaw Controls (Australia) Pty. Limited, Pendle Hill, Australia

[21] Appl. No.: 516,691

[22] Filed: Jul. 22, 1983

[30] Foreign Application Priority Data

Aug. 2, 1982 [AU] Australia ............................... PF5168

[51] Int. Cl.³ ............................................ G05D 23/13
[52] U.S. Cl. ............................ 236/12.14; 236/DIG. 2; 236/100
[58] Field of Search ........... 236/12.14, DIG. 2, 93 A, 236/100; 137/605

[56] References Cited

U.S. PATENT DOCUMENTS

| | | | |
|---|---|---|---|
| 2,270,641 | 1/1942 | Ruppert et al. | 236/12.14 X |
| 2,520,446 | 8/1950 | Thrush | 236/12.14 |
| 2,828,075 | 3/1958 | Panza et al. | 236/DIG. 2 |
| 2,855,151 | 10/1958 | Lesovsky | 236/12.14 |
| 2,910,242 | 10/1959 | Freismuth et al. | 236/12.14 |
| 3,128,043 | 4/1964 | Feinberg | 236/93 A |

Primary Examiner—William E. Tapolcai
Attorney, Agent, or Firm—Ladas & Parry

[57] ABSTRACT

A water mixing valve which provides for controlled admission of cold water into a hot water stream and which also provides for cold water to be bled into the hot water stream in the event that the mixing valve should fail to operate in the intended manner, so that water flowing from the mixing valve will always have a temperature lower than that of the hot water admitted to the mixing valve. The mixing valve includes a first passage which is connectable in a hot water supply line, a thermostat element located in the first passage, and second and third passages which are connectable to a supply of cold water. A piston-type regulator valve element is located within a cylindrical chamber of the mixing valve and is actuated by the thermostat element to regulate flow of cold water from the second passage to the first passage, and, in the event of failure of the thermostat element, the regulator valve element is biased to a position such that water is admitted to the first passage by way of the third passage.

10 Claims, 6 Drawing Figures

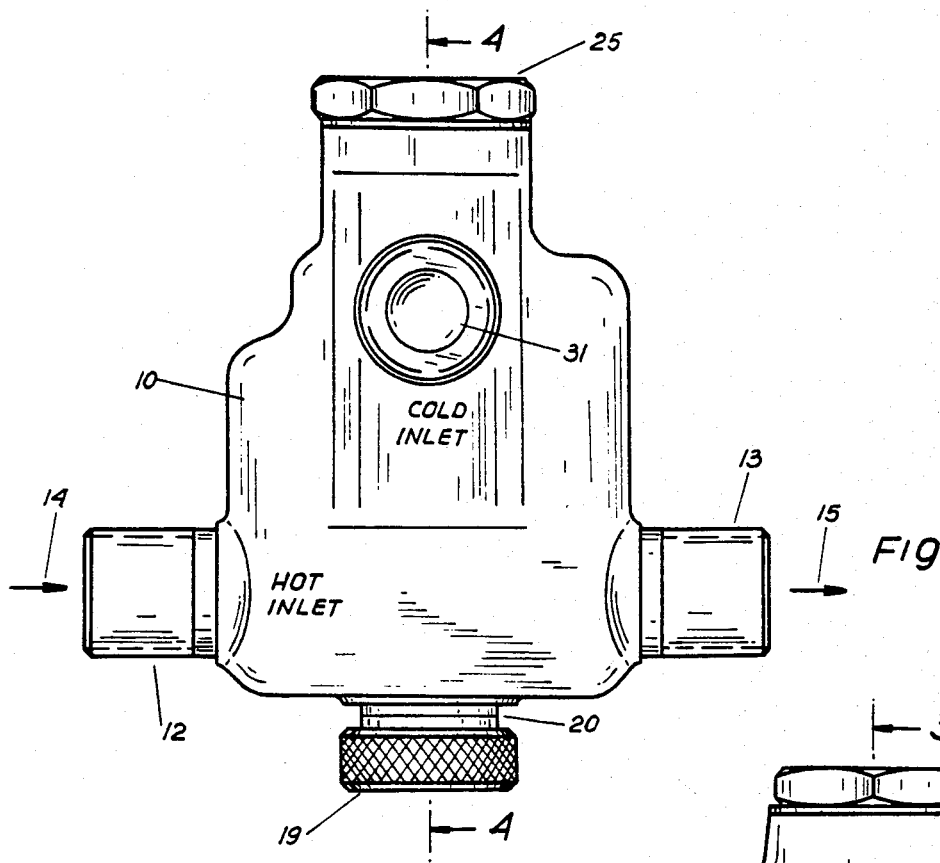
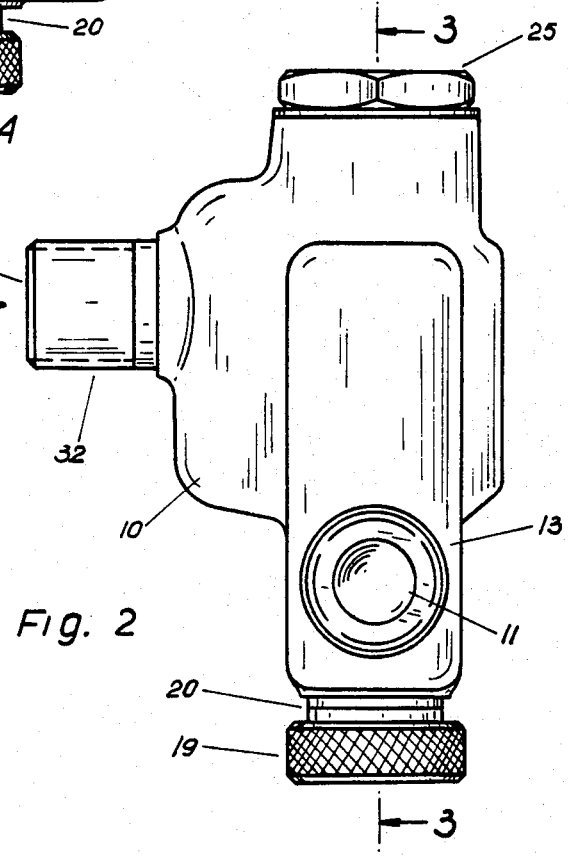

MIXING VALVE

FIELD OF THE INVENTION

This invention relates to a mixing valve which is suitable for use in regulating the mix ratio of fluid streams that are admitted to the valve and which functions to provide an output stream having a temperature which is proportional to the mixture ratio of the inlet streams. The valve is herein termed "a water mixing valve" but it will be understood that it may be used for controlled mixing of other fluids.

BACKGROUND OF THE INVENTION

Mixing valves are, in general, well known and a typical such valve comprises a through channel which is connected in series with a hot water supply line. A cold water inlet is also provided in the mixing valve and it communicates with the through channel at the upstream side of a thermostat element. The thermostat element is located in the channel and it functions to control the temperature of water passing from the mixing valve. A regulator valve element is located in a fluid passage between the cold water inlet and the through channel, and such valve element is controlled by the thermostat element to regulate the quantity of cold water which is admitted into the through channel to mix with the hot water. Thus, the thermostat element senses the temperature of the hot-and-cold water mix and controls the regulator valve element to provide a mix ratio that results in a required (pre-determined) outflow temperature. The thermostat element is selected or adjustable to provide for the required outflow temperature.

A number of different types of mixing valves which embody the above described construction are known and they incorporate mechanisms of varying degrees of complexity. However, it is believed that all prior art mixing valves are incapable of fail-safe operation, in the sense that they do not function to provide a low temperature outflow in the event that the thermostat element should fail to operate. For example, in the known mixing valves which use a wax-filled thermostat element, the regulating valve element will not be actuated and, in a worst case situation, no cold water will be admitted into the hot water stream if the thermostat element fails to function as a result of wax bleeding away from such element. The temperature of the outflowing water will then be approximately equal to that of the inflowing water, with potentially hazardous results.

SUMMARY OF PRESENT INVENTION

The present invention seeks to avoid the above problem by providing a mixing valve which will function to provide for an outflow fluid temperature which is less than the inflow fluid temperature if the thermostat element should fail to control the regulator valve element in the intended manner.

Thus, the present invention provides a mixing valve comprising first, second and third fluid flow passages, the first passage being connectable in a high temperature fluid supply line and the other two of which are connectable with a low temperature fluid supply. The second and third passages communicate with the first passage, and a thermostat element located within the mixing valve is thermally contactable by fluid passing through the first passage. Valve means located within the mixing valve are operable to regulate flow of fluid from the second passage to the first passage under the influence of the thermostat element and to bleed fluid from the third passage to the first passage if fluid flow from the second passage to the first passage is restricted to a predetermined extent.

In a preferred form, the mixing valve comprises a first fluid flow passage which is connectable in a high temperature fluid supply line, a thermostat element located in or adjacent the first passage and thermally contactable by fluid passing through the first passage, and a second fluid flow passage which is connectable with a supply of low temperature fluid and which communicates with the first passage upstream of the thermostat element. A regulator valve element is located in circuit with the second passage and is actuatable by the thermostat element to regulate flow of low temperature fluid to the first passage from the second passage. Also, the mixing valve incorporates a third fluid flow passage which is connectable with the supply of low temperature fluid and which communicates with the first passage, and valve means are located in circuit with the third passage. The valve means are arranged to admit flow of low temperature fluid to the first passage from the third passage if flow of fluid from the second passage to the first passage is restricted to a predetermined extent.

When the above defined device is used as a water mixing valve, hot water is connected to the first passage and, in passing through such passage, contacts the thermostat element. Also, cold water is admitted to the first passage by way of the second passage and the regulator valve, the amount of cold water admitted at any one time being regulated by the regulator valve to produce a mix ratio which is determined by the setting of thermostat element. Should the thermostat element fail to function correctly, so that the regulator valve is caused to close (or almost close) and prevent (or severely restrict) admission of cold water to the first passage by way of the second passage, the valve means associated with the third passage will open. Then, cold water will be admitted to the first passage by way of the third passage and the temperature of the water flowing from the mixing valve will be reduced relative to the temperature of the inflowing hot water.

PREFERRED FEATURES OF PRESENT INVENTION

The effective cross-sectional areas of the first and third passages are preferably sized such that, when cold water from the third passage mixes with hot water passing through the first passage, the resultant water mix has a temperature substantially lower than the temperature of the hot water. Most preferably, the resultant water mix has a temperature falling within the range of 0.25 to 0.75 times the temperature of the hot water which is admitted to the mixing valve. Also, the third passage is preferably disposed so that it communicates with the first passage at a region downstream of the thermostat element.

The valve means associated with the third passage is preferably coupled with the regulator valve element and, most preferably, is formed integrally with the regulator valve element. In accordance with a particularly preferred embodiment of the invention, a piston type regulator valve element is provided to function in a manner such that, when moved in one direction, it permits cold water to pass into the first passage by way of the second passage and, when moved to a predetermined extent in the opposite direction, it permits cold water to pass into the first passage by way of the third passage.

Various types of thermostat elements may be used; for example, a wax-filled thermostat element having a projecting plunger-type pin which engages with the regulator valve and which functions to open the regulator valve with increasing temperature of water contacting the thermostat element.

The invention will be more fully understood from the following description of a preferred embodiment of a water mixing valve, the description being given with reference to the accompanying drawings.

BRIEF DESCRIPTION OF THE DRAWINGS

The the drawings,

FIG. 1 shows a front elevation view of the mixing valve,

FIG. 2 shows a side elevation view of the mixing valve,

DETAILED DESCRIPTION OF THE INVENTION

Figure 3A:
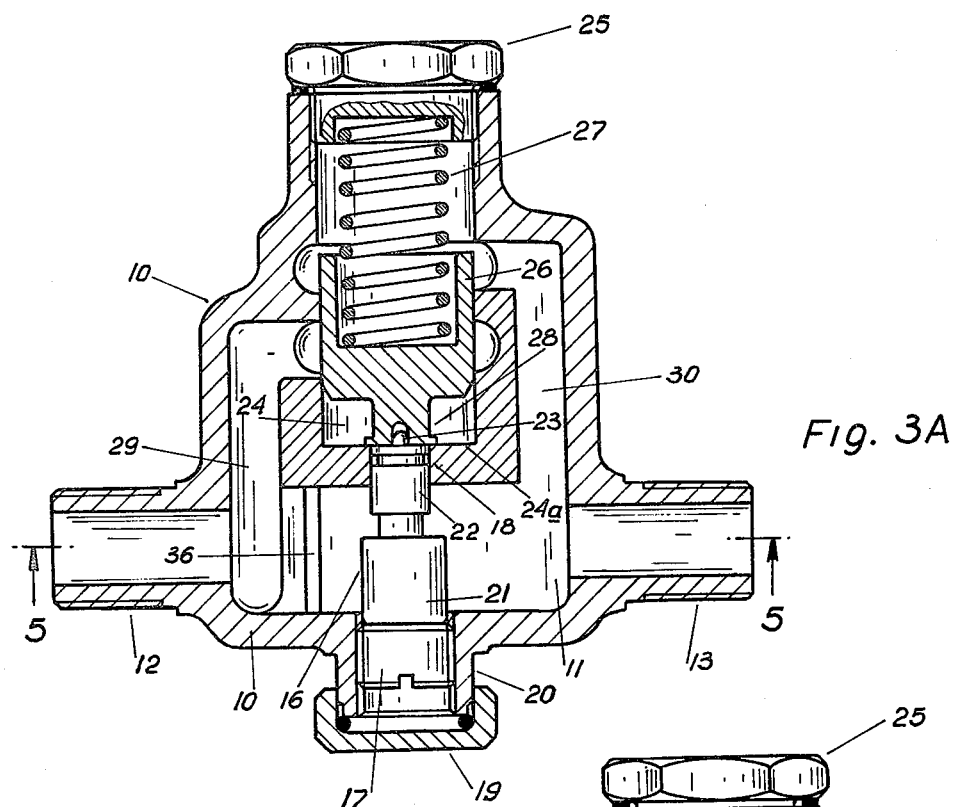
FIG. 3A shows a sectional elevation view of the mixing valve as seen in the direction of section plane 3—3 which is shown in FIG. 2.

As illustrated, the mixing valve comprises a valve body 10 which is formed at its lower end with a first (through) passage 11. The wall surrounding the passage 11 includes two threaded spigots 12 and 13 and the mixing valve is connectable in series with a hot water supply by way of the threaded spigots. Hot water from an upstream heater (not shown) is delivered to the mixing valve in the direction of arrow 14 and a hot-cold water mix passes from the valve in the direction of arrow 15.

A thermostat element 16 is located within the passage 11, such that it is contacted by water flowing through the passage, and the thermostat element is positioned by an adjusting screw 17 which is located within a lower embossment 20 of the casing 10. The thermostat element 16 projects into an aperture 18 within the valve body 10, and the screw 17 may be turned to determine the extent to which the thermostat element 16 extends into the aperture 18. An end cap 19 is screw connected to the embossment 20 of the casing 10 so as to prevent unauthorised adjustment of the screw 17 and to prevent leakage of any water which might migrate past the screw 17. As an alternative form of construction, a plug may be located as an interference fit within the bore of the embossment 20 below the level of the screw 17.

The thermostat element 16 may be of a type known in the art and it comprises a lower casing portion 21 which is charged with wax or other material which has a high coefficient of thermal expansion. The thermostat element 16 further comprises a piston which bears against the wax within the lower casing portion 21, an upper casing portion 22 which locates within the aperture 18, and a piston rod or pin 23 which projects upwardly from the casing portion 22. When the thermostat element is exposed to temperatures greater than a predetermined temperature, the wax within the casing portion 21 is caused to melt and expand. Then, the pin 23 is caused to move outwardly from the casing portion 22 to an extent which increases with increasing temperature.

A generally cylindrical cavity 24 is formed within the interior of the valve body 10 and is closed at its upper end by an end cap 25. A gasket is located under the cap 25 so as to preclude leakage of water. Also, a piston-type valve member 26 is slideably located within the cavity 24 and is acted upon by a helical compression spring 27. The operation of the valve member 26 will be hereinafter described and, for the time being, it is sufficient to say that a lower projection 28 of the valve member is biased into engagement with a base 24a of the cavity 24 (FIGS. 3A and 4) or into engagement with the projecting pin 23 of the thermostat element 16 (FIG. 3B) under the influence of the spring 27. Thus, the position of the valve member 26 within the cavity 24 is determined by the extent to which the pin 23 projects from the thermostat element 16.

A second passage 29 is formed within the valve body 10 and extends between the cavity 24 and the first passage 11. The second passage 29 communicates with the first passage 11 at a point upstream of the thermostat element 16.

Also, a third passage 30 is formed within the valve body 10 and extends between the cavity 24 and the first passage 11. The third passage 30 is separate from the second passage 29 and it communicates with the first passage 11 at the downstream side of the thermostat element 16.

The third passage 30 communicates with the cavity 24 in the valve body 10 at a level above that at which the second passage 29 communicates with the cavity 24.

A cold water inlet port 31 extends into the valve body 10 and the wall surrounding such port comprises a threaded spigot 32 which is connectable with a cold water supply line. The cold water is directed into the mixing valve in the direction indicated by arrow 33 in FIG. 4.

The inlet port 31 divides into two channels 34 and 35, the upper one (34) of which opens into the cavity 24 above the level of the valve member 26 and the lower one (35) of which opens into the cavity 24 at a level below the valve member 26.

Figure 3B:
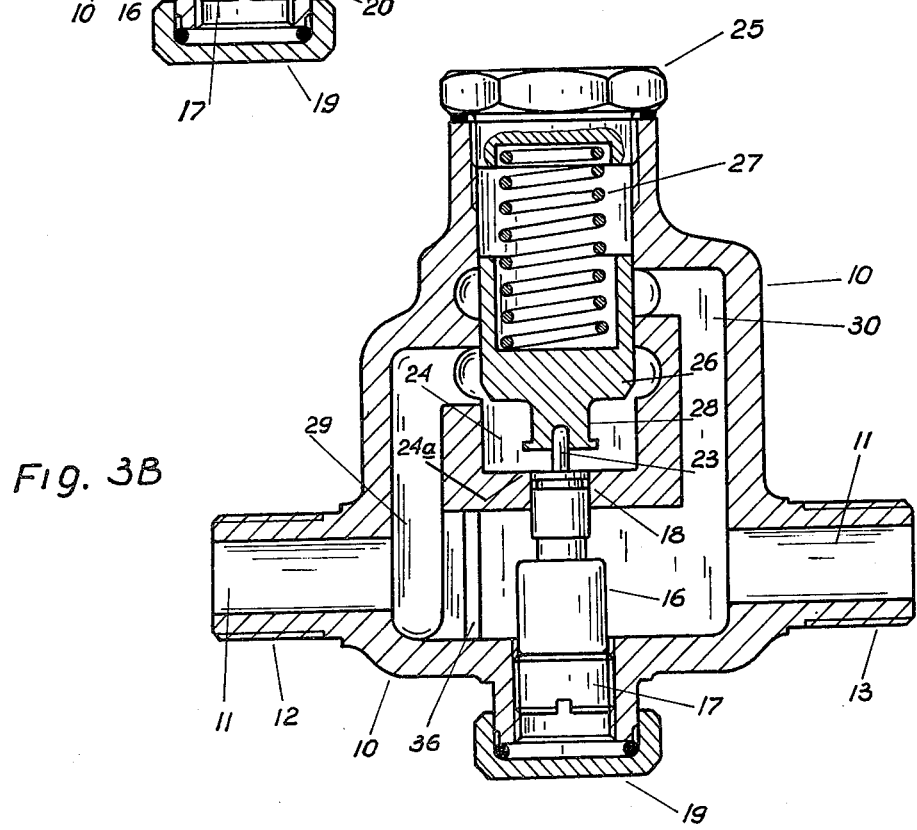
FIG. 3B shows a view similar to that illustrated in FIG. 3A, but with a regulator valve element of the mixing valve located in a different position.
Figure 4:
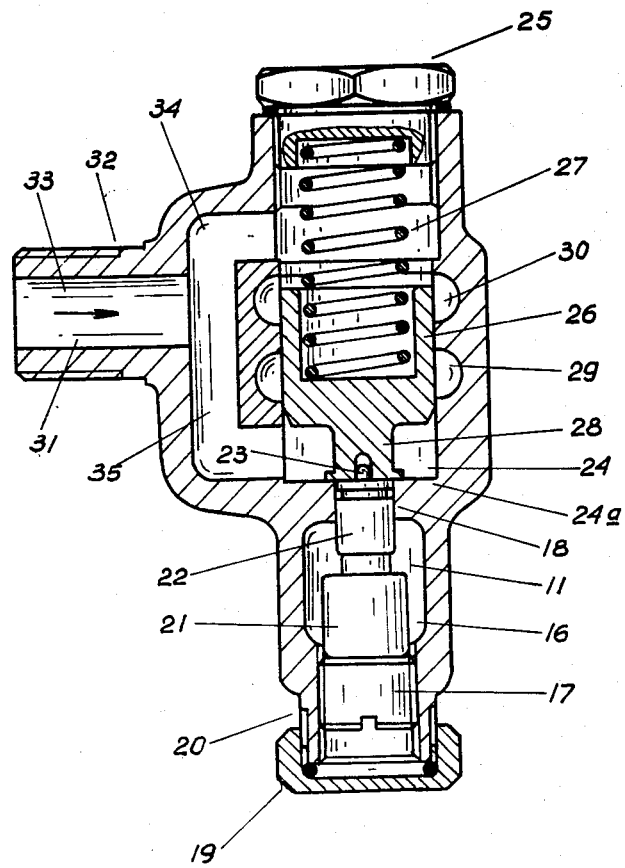
FIG. 4 shows a sectional elevation view of the mixing valve as seen in the direction of section plane 4—4 shown in FIG. 1.
Figure 5:
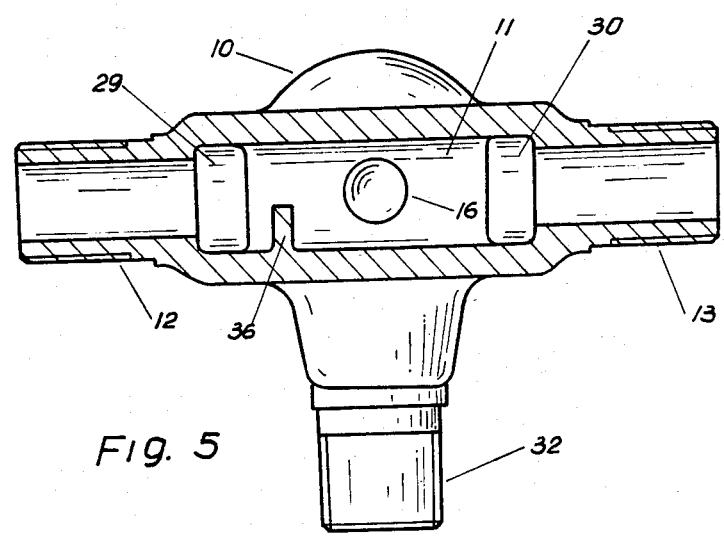
FIG. 5 shows a sectional view of the mixing valve as seen in the direction of section plane 5—5 shown in FIG. 3A.

During normal operation of the mixing valve (as illustrated in FIG. 3B), hot water is directed into the first passage 11 and, at the same time, cold water is directed into the first passage 11 by way of the inlet port 31, channel 35, chamber 24 and the second passage 29 to mix with the hot water in the passage 11. The resultant water mix then passes through the passage 11 and, in so doing, contacts the thermostat element 16. Also, prior to contacting the thermostat element 16, turbulence is induced in the water mix by a baffle 36 which is located within the passage 11 at a position upstream of the thermostat element.

If the resultant water mix has a temperature greater than or less than a predetermined temperature, the wax within the thermostat element 16 is caused to expand or contract and, thus, the piston pin 23 will be caused to move outwardly from or retract into the casing portion 22 of the thermostat element 16. If the temperature of the water mix is greater than a predetermined level, the upward movement of the thermostat pin 23 will cause the valve member 26 to move upwardly against the spring 27 so that a greater quantity of cold water will be able to flow into the second passage 29 from the chamber 24 in the valve body. Conversely, if the temperature of the water mix in the first passage 11 is lower than a predetermined temperature, the wax within the thermostat element 16 will be caused to contract and the valve member 26 will move downwardly within the chamber 24 so as to reduce the flow of cold water from the central chamber to the second passage 29. Thus, the valve member 26 is controlled by the thermostat element to move upwardly and downwardly and, so, to progressively increase or decrease exposure of the second passage 29 to the chamber 24 in the body of the mixing valve.

Should the thermostat element 16 fail to function in the intended manner and should a worst-case situation occur in which the valve member 26 is caused to move downwardly to an extent such that cold water flow through the second passage 29 is terminated, the water flowing from the mixing valve would, but for the presence of the third passage 30, be approximately equal to the temperature of the hot water flowing into the mixing valve. However, as shown in FIG. 3A, when the valve member 26 moves downwardly to an extent sufficient to terminate flow of cold water into the second passage 29, the upper surface of the valve member 26 moves below the level at which the third passage 30 communicates with the chamber 24 in the mixing valve body. Then, cold water will flow into the first passage 11 by way of the cold water inlet port 31 and channel 34. The water passing through channel 34 enters the upper region of the chamber 24 and then moves into the third passage 30 to pass downwardly into the first passage 11.

Thus, the mixing valve is constructed and arranged to provide for failsafe operation in the sense that, should the thermostat element 16 fail and be overridden by the spring 27, cold water will be bled into the mixing valve at a point downstream of the thermostat element. Then, the water flowing from the mixing valve will have a temperature lower than that entering the hot water inlet of the mixing valve.

We claim:

1. A mixing valve comprising first, second and third fluid flow passages, the first passage being connectable in a high temperature fluid supply line, the second and third passages being connectable with a low temperature fluid supply and communicating with the first passage, a thermostat element contactable thermally by fluid passing through the first passsage, and valve means operable to regulate flow of fluid from the second passage to the first passage under the influence of the thermostat element and to bleed fluid from the third passage to the first passage if fluid flow from the second passage to the first passage is restricted to a predetermined extent.

2. A mixing valve comprising a first fluid flow passage which is connectable in a high temperature fluid supply line, a thermostat element located in or adjacent the first passage and contactable thermally by fluid passing through the first passage, a second fluid flow passage which is connectable with a supply of low temperature fluid and which communicates with the first passage upstream of the thermostat element, a regulator valve element located in circuit with the second passage and actuatable by the thermostat element to regulate flow of low temperature fluid to the first passage from the second passage, a third fluid flow passage which is connectable with the low temperature fluid supply and which communicates with the first passage, and valve means located in circuit with the third passage, the valve means being arranged to admit fluid to the first passage from the third passage if flow of fluid to the first passage from the second passage is restricted to a predetermined extent.

3. The mixing valve as claimed in claim 2 wherein the valve means is formed integrally with the regulator valve element.

4. The mixing valve as claimed in claim 3 wherein the valve means and the regulator valve element are embodied in a single piston-type valve member which is slideable within a cylindrical chamber, the valve member being slideable in a first direction to expose the second passage to a low temperature fluid supply channel and the valve member being slidable in a second (opposite) direction to expose the third passage to a low temperature fluid supply channel.

5. The mixing valve as claimed in claim 4 wherein the thermostat element acts against the valve member to move it in the first direction to an increasing extent with exposure of the thermostat element to increasing temperature.

6. The mixing valve as claimed in claim 5 wherein the valve member is biased in the second direction by a compression spring.

7. The mixing valve as claimed in claim 4 and including an inlet port connectable with a supply of low temperature fluid, the inlet port communicating with upper and lower said channels which communicate with upper and lower regions respectively of the chamber.

8. The mixing valve as claimed in claim 7 wherein the second passage communicates with the chamber at a level above the lower channel and wherein the third passage communicates with the chamber at a level below the upper channel.

9. The mixing valve as claimed in claim 2 wherein the third passage communicates with the first passage downstream of the thermostat element.

10. The mixing valve as claimed in claim 2 wherein a baffle is located within the first passage in a region between the thermostat element and the point of communication of the second passage with the first passage, the baffle being arranged to induce turbulence in fluid passing through the first passage.

* * * * *